United States Patent
Rosebrook, Sr.

[15] 3,675,890
[45] July 11, 1972

[54] BOOSTER SERVO CONTROLLED VALVE CONTROL MECHANISM

[72] Inventor: Roy Rosebrook, Sr., Downey, Calif.
[73] Assignee: Anellux Systems Corporation, El Segundo, Calif.
[22] Filed: Feb. 16, 1970
[21] Appl. No.: 11,526

[52] U.S. Cl. .................................... 251/3, 91/37, 91/378
[51] Int. Cl. ........................................ B23q 35/16
[58] Field of Search ............. 251/3; 90/62; 91/37, 378; 60/97 T

[56] References Cited

UNITED STATES PATENTS

| | | | |
|---|---|---|---|
| 2,491,551 | 12/1949 | Cross | 91/378 X |
| 2,618,244 | 11/1952 | Roehm | 251/3 X |
| 3,390,859 | 7/1968 | Rosebrook | 91/37 X |

OTHER PUBLICATIONS

Machinery, Nov. 29, 1951, Vol. 79, pp. 950–951.

Primary Examiner—M. Cary Nelson
Assistant Examiner—Richard Gerard
Attorney—Jessup & Beecher

[57] ABSTRACT

A valve control mechanism is provided which is particularly well suited to be used in conjunction with an hydraulically operated machine tool, such as a milling machine, lathe, or similar machine. A tracer mechanism actuates the valve which in turn hydraulically controls the movement of the machine tool. The disclosure is particularly concerned with such a valve control mechanism which incorporates a booster servo system for facilitating the operation of the mechanism and thus lightening the contact pressure of the stylus of the tracer mechanism on the guiding template.

5 Claims, 3 Drawing Figures

INVENTOR:
Roy Rosebrook, Sr.

BOOSTER SERVO CONTROLLED VALVE CONTROL MECHANISM

BACKGROUND OF THE INVENTION

Tracer controlled valve mechanisms are generally known to the art, and such control mechanisms usually include a pivotally mounted stylus. The stylus is intended to be moved along the contours of a template so as to cause a controlled machine tool to duplicate the pattern represented by the template. Such mechanisms are also known in which the stylus is vertically movable to respond to Z-axis variations of the template.

An improved tracer controlled valve mechanism of the general type described in the preceding paragraph is disclosed and claimed in U.S. Pat. No. 3,588,033 issued June 28, 1971. In such a mechanism, both the template and workpiece are mounted on a common work table, and the work table is moved in a direction such that the stylus of the tracer control mechanism moves across the surface of the template. As the stylus moves along a particular X-axis across the template, the operative element of the controlled machine tool moves along a corresponding axis of the workpiece. Then, when the stylus meets a depression, for example, in the template, the operative element of the machine tool also moves along a corresponding Z-axis with respect to the workpiece.

Mechanisms of the type disclosed and claimed in the patent have been found to operate with a high degree of precision and satisfaction. However, it has been found that under some circumstances, the control pressure of the stylus on the template is excessive because an excessive amount of force is required for it to cause the internal spindle in the mechanism to move against associated valve controls.

The tracer controlled valve mechanism of the present invention, as will be described, includes a booster servo system which assists the movement of the internal spindle in the mechanism, so that only a small amount of force is required at the end of the stylus to effectuate the desired actuation of the internal operating components of the mechanism.

The use of the booster servo system in the control mechanism of the present invention obviates excessive friction forces which are often developed at the universal joints within the tracer mechanism. It has been found, for example, in the prior mechanisms that when an excessive force was applied to the stylus, excessive friction side forces were developed on the balls forming the system joints. Such excessive side forces had a tendency to develop considerable frictional binding, so that the bias or return springs included in the mechanisms were sometimes unable to drop the balls down to the bottom of their sockets because of frictional binding.

In the mechanism of the present invention, a servo booster system is used to lighten the stresses exerted on the stylus by the valve control mechanism, so that no excessive frictional side forces are developed within the mechanism. The entire control mechanism operates easily and smooth, with a minimum of force being required at the stylus to actuate the mechanism.

DETAILED DESCRIPTION OF THE ILLUSTRATED EMBODIMENT

Figure 1:
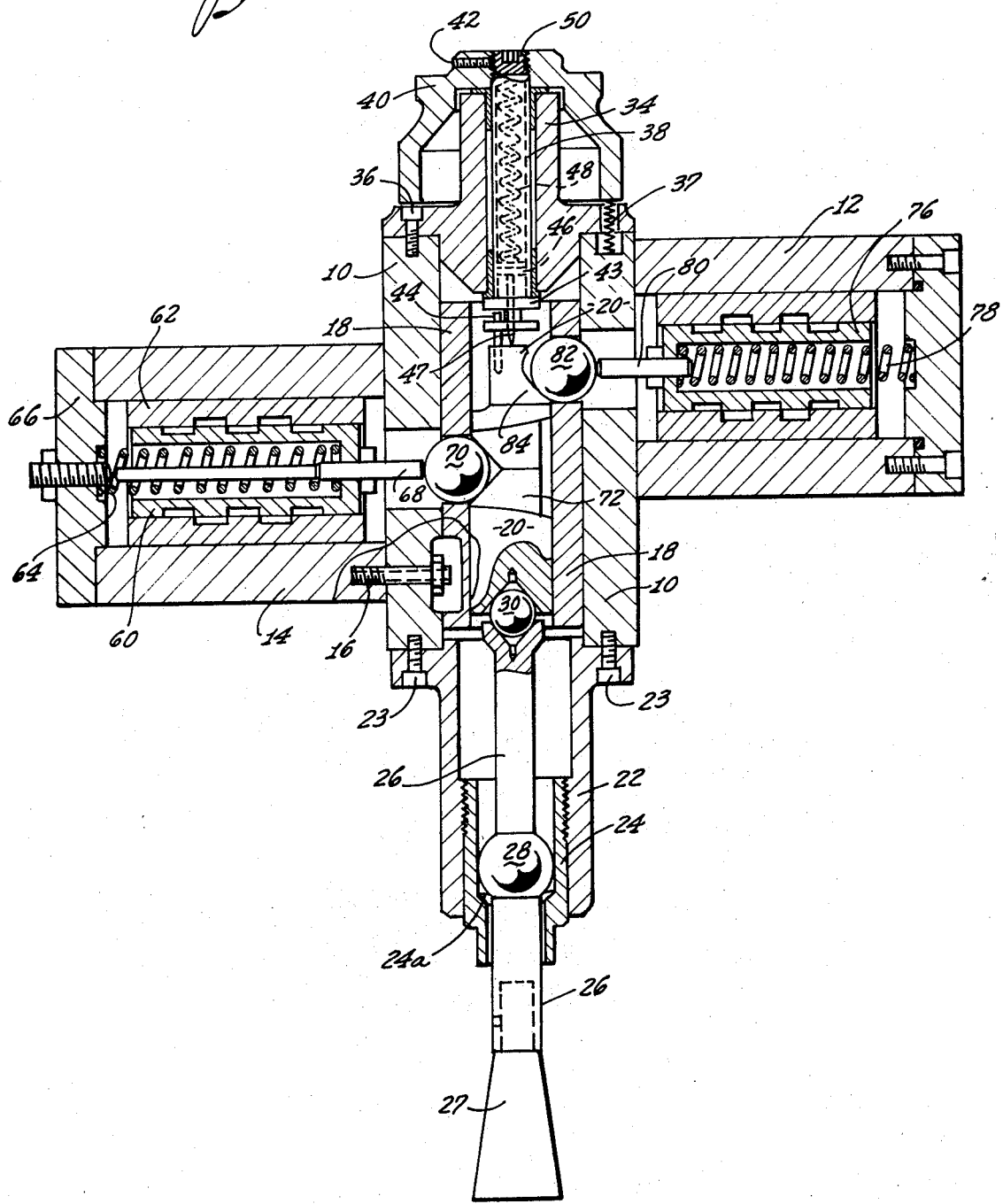
FIG. 1 is an elevational section of the tracer control mechanism which was disclosed and described in the aforementioned patent.

The tracer controlled valve mechanism shown in FIG. 1 includes a tubular housing 10. A first hydraulic servo control valve assembly 12 is mounted on the housing 10 and extends radially outwardly from the housing. Opposite thereto, a second hydraulic control valve assembly 14 is mounted on the housing 10, and likewise extends radially outwardly from the housing. The control valve assemblies 12 and 14 may be mounted on the housing 10 by means, for example, of threaded fasteners 16.

The housing 10 includes a sleeve 18 which is mounted within the housing and which constitutes, for example, a bearing surface for an upper spindle 20 which is slidable within the sleeve for rectilinear reciprocal movement therein, and which is also rotatable within the sleeve. A tubular end portion 22 is affixed to the lower end of the housing 10 in coaxial relationship therewith, being attached by means, for example, of screws 23.

A lower sleeve 24 is threaded into the end of the tubular end portion 22, and an elongated lower spindle 26 is universally pivotally mounted within the sleeve 24 by means of an integral ball 28. As shown, the spindle 26 protrudes from the lower end of the sleeve 24, and carries a stylus 27. The sleeve 24 provides a seat 24a for the ball 28, and permits not only pivotal movement of the spindle 26, but also reciprocal vertical movement of the stylus, by lifting of the ball 28 off of seat 24a. The lower spindle 26 is coupled to the upper spindle 20 by means of a ball 30 which fits into a conical cavity in the lower end of spindle 20 and into a corresponding conical cavity in the upper end of spindle 26.

A head member 34 is mounted on the housing 10 by means, for example, of screws 36. The head member 34 has a central bore which is axially aligned with the longitudinal axis of the spindle 20. A tubular control shaft 38 extends through the central bore in the head 34, and a control knob 40 is affixed to the shaft 38 by means, for example, of a set screw 42.

The lower end of shaft 38 is closed by a disk 43, from which depends an off-center pin 44 coupling the lower end of the shaft 38 to the spindle 20. Thus rotation of the shaft 38 by the manual turning of the control knob 40 produces a corresponding rotation of the spindle 20 within the sleeve 18 of the housing 10. A plunger 46 is positioned in the tubular shaft 38, and has an axial prod 47 which extends down through disk 43 and bears against the upper end of the spindle 20. A spring 48 within the tubular shaft 38 biases the plunger against the spindle 20. An adjusting screw 50 holds the spring 48 within the shaft 38.

The spring-biased plunger 46 urges the spindle 20 downward in the sleeve 18. This, in turn, through ball 30 and lower spindle 26, urges the stylus 27 on the end of the spindle 26 down against the surface of the template (not shown) which is engaged by the lower end of the stylus. The template normally displaces the stylus 27 and spindle 26 upwardly in the housing 10, so that its ball 28 is normally spaced above the seat 24a. This constitutes the "null" position of the spindles 26 and 20. When the stylus 27 on the spindle 26 engages a depression in the upper surface of the template, spring 48 biases the stylus down into the depression, with the ball 28 moving towards its seat 24a. This downward movement of the spindle 26, of course, is accompanied by a corresponding downward movement of the spindle 20. Conversely, any upward movement of the spindle 26 as the stylus 27 moves up over a vertical protuberance produces a corresponding displacement of ball 28 away from the seat 24a, with corresponding linear movement of the spindle 20 upwardly in the sleeve 18.

When the stylus 27 on the spindle 26 meets a lateral protuberance in the surface of the template, it deflects to the side as its leading edge meets the edge of the protuberance. This deflection tilts the spindle 26 and produces an upwardly movement of the spindle 20 within the sleeve 18, by virtue of the coupling between the lower spindle 26 and the upper spindle 20, through the ball 30.

As mentioned above, it has been found that in the operation of the mechanism of FIG. 1, some difficulty is experienced because of the excessive amount of force necessary to tilt the stylus 27, and when excessive forces are applied at the side of the stylus, similar excessive forces are developed at the side of the ball 30 in the universal joint formed by the ball between the spindles 20 and 26 and between the ball 28 and sleeve 24. As also mentioned, these side forces develop considerable frictional binding, and the return spring 48 is sometimes unable to drive the balls 30 and 28 down to the bottom of their respective seats because of such frictional binding. The booster servo system to be described in conjunction with FIG. 2 removes excessive stresses from the stylus, and permits relatively light forces exerted on the stylus to be transmitted to the mechanism to initiate the appropriate controls, so as to obviate entirely any tendency for the aforesaid frictional binding.

The control valve 14 may be an X-axis feed control for the mechanism. It includes a spool 60 which is movable in the valve housing 62. The spool is biased, for example, by a spring 64 which bears against the cover 66 of the housing, so that the end of a central pin 68, which is affixed to the spool, engages a ball 70. The ball 70 is supported in an opening in the side of the sleeve 18, and it engages as a cam follower, a first cam member 72 formed on the spindle 20.

The control valve 12 may be a Z-axis feed control for the mechanism. It includes a spool 76 which is movable in the valve housing. The spool is biased, for example, by a spring 78 which bears against the cover of the housing, so that the end of a central pin 80, which is affixed to the spool, engages a ball 82. The ball 82 is supported in an opening in the side of the sleeve 18, and engages a second cam member 84 formed on the spindle 20. As the spindle 20 turns, the cam 84 presents various inclinations to the ball 82, as explained in said patent. Such turning is effected by knob 40, by virtue of the coupling through the off-center pin 44.

The operation of the mechanism of FIG. 1 is fully described in said patent, and a detailed description thereof is believed unnecessary for the purposes of the present invention. It should be understood that the particular tracer controlled valve mechanism of FIG. 1 is but one type of mechanism in which the servo booster system may be incorporated in the practice of the invention. It will become evident as the description proceeds, that the booster servo system may be incorporated into a wide variety of valve mechanisms, in which it is desired to permit a stylus or other valve operating member to operate the internal components of the valve mechanism without the need to subject it to excessive operating stresses.

Figure 2:
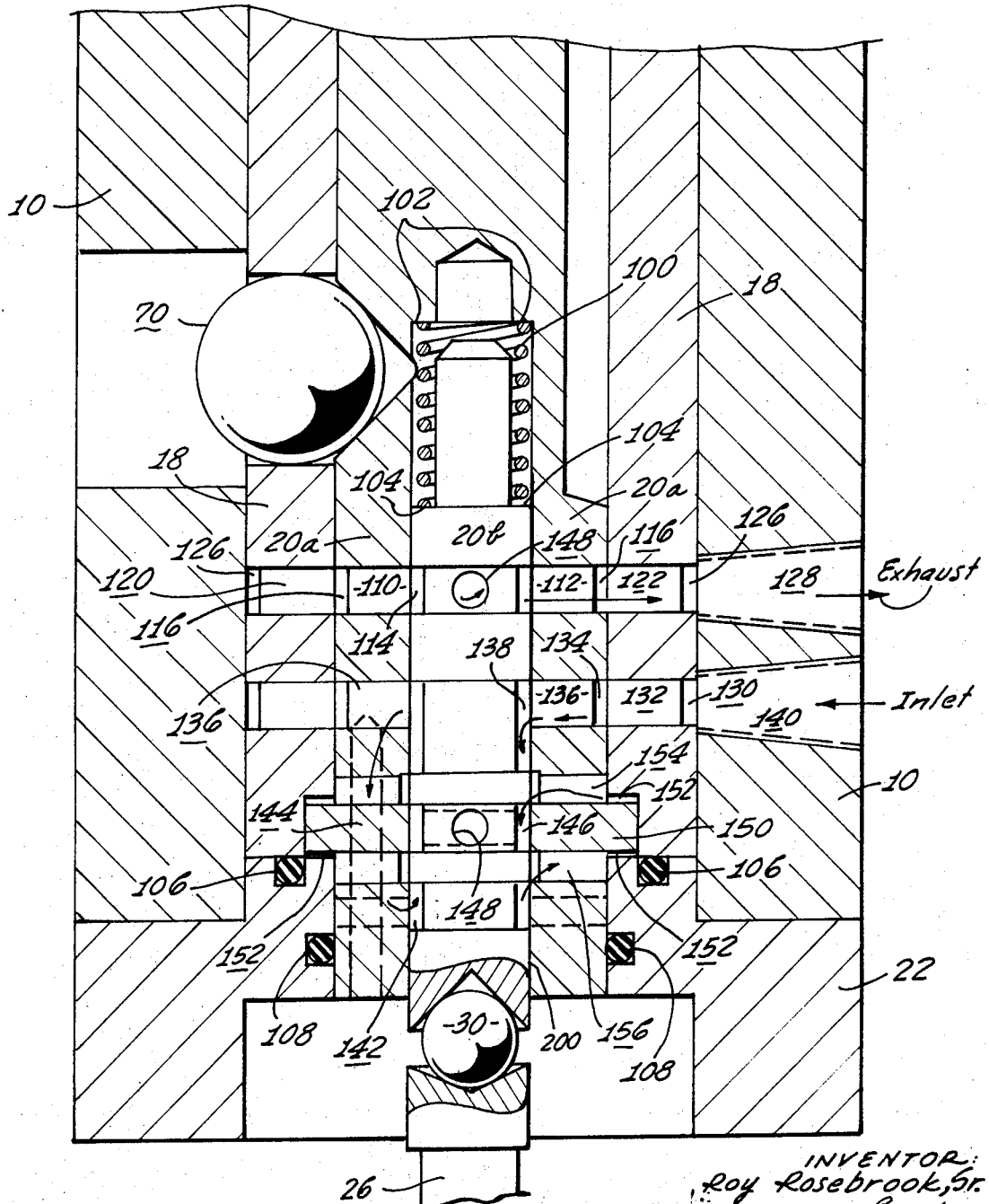
FIG. 2 is a fragmentary longitudinal section showing the modifications made to the structure of FIG. 1 in order to incorporate the booster servo mechanism into the combination, in accordance with the present invention.

In the fragmentary representation of FIG. 2, portions of the mechanism which are identical to those in the previous mechanism of FIG. 1 are designated by the same numbers. In FIG. 2, the spindle 20 of FIG. 1 has been replaced by a coaxial combination of a sleeve 20a and an internal spindle 20b. The ball 30 engages a conical socket at the lower end of the spindle 20b. Movements of the stylus 27 and lower spindle 26, instead of moving the entire spindle 20 and all its associated components, such as the balls 70 and 82 and the loads bearing against those balls, cause only the spindle 20b to move reciprocally in the sleeve 20a against the bias of a spring 100. The spring 100 is positioned in the upper end of the bore of the sleeve 20a, and is compressed between a shoulder 102 in the sleeve and a shoulder 104 on the spindle 20b.

Movement of the spindle 20b along its longitudinal axis creates an hydraulic boosting effect, to be described, which produces similar movements of the sleeve 20a. In the embodiment of FIG. 2, it is the sleeve 20a, rather than the spindle 20b, which directly actuates the valves 12 and 14 of FIG. 1, through the balls 70 and 82. The force applied to the sleeve 20a by the servo boost system of the present invention is greatly amplified, so that no excessive forces are required insofar as the stylus 27, and the spindles 26 and 20b are concerned.

In the mechanism of FIG. 2, the sleeve 18 is sealed to the lower tubular portion 22 by means, for example, of an O-ring 106, and the sleeve 20a is slidably sealed to the lower tubular portion 22 by means of an O-ring 108. The sleeve 20a has a pair of radial ports 110 and 112 formed in it, and the spindle 20b has an annular groove 114 which communicates with the radial ports 110 and 112. The sleeve 20a also has an external annular groove 116 which surrounds the radial ports 110 and 112, and which communicates with a pair of radial ports 120 and 122 in the sleeve 18. The sleeve 18 has an external annular groove 126 which surrounds the radial ports 120 and 122. The outer casing 10 includes an exhaust port 128 which communicates with the annular groove 126 on the sleeve 18. It will be appreciated that by means of the series of radial ports and annular grooves 110, 112, 114, 116, 120, 122 and 126 any pressurized fluid introduced into the annular groove 114 of the spindle 20b is exhausted through the exhaust port 128 in the casing 10. A similar series of annular grooves and radial ports designated 130, 132, 134, 136, and 138 extend between an inlet port 140 in the casing to permit pressurized fluid to be introduced into the annular groove 138 around the spindle 20b.

The spindle 20b has a further annular groove 142 near its lower end. A longitudinal passageway 144 in the sleeve 20a provides a path for the pressurized fluid from the radial port 136 to the groove 142. The spindle 20b includes a further annular groove 146 spaced up from the annular groove 142, and an internal longitudinal passageway 148 couples the groove 146 to the upper annular groove 114.

An annular piston 150, fixedly and coaxially formed or mounted on the sleeve 20a reciprocates in an annular cylinder 152 formed in the sleeve 18. The sleeve 20a has a radial port 154 adjacent the upper end of the annular cylinder 152, and it has a radial port 156 adjacent the lower end of the annular cylinder 152.

Operating power for the servo boost system of FIG. 2 is provided by introducing pressurized fluid such as hydraulic oil, into the mechanism through the inlet port 140. The fluid flows through the grooves and ports 130, 132, 136, 138, and down the passage 144 to the annular groove 142.

Any movement of the central spindle 20b upwardly against the bias of the spring 100 cracks an opening between the annular groove 142 and the radial port 156, and pressurized fluid flows into the lower part of the cylinder 152 forcing the annular piston 150 upwardly, and with it, the sleeve 20a. The movement of the central spindle 20b also cracks a coupling between the port 154 and the annular groove 146, so that fluid in the upper part of the annular cylinder 152 flows through the port and groove 154 and 146 to the passageway 148, and then through the passages 114, 112, 122, to the exhaust port 128. As the piston 150 and spindle 20a move upwardly the crack from the inlet groove 142 to the radial port 156, and the crack from the port 154 to the groove 146, close off. This stops further movement of the sleeve 20a.

In the manner described above, any movement upwardly of the central spindle 20b to a new upwardly displaced position within the mechanism, causes the coaxial sleeve 20a immediately to follow and to slide upwardly on the spindle 20b and assume the same axial position as the spindle 20a. The operation of the tracer control mechanism thereafter follows the same pattern as in the embodiment of FIG. 1. However, a slight pressure on the stylus 27 produces an amplified force against the annular piston 150, so that the mechanism is operated easily and without any excessive side frictional forces.

Likewise, any downward movement of the spindle 20b produces a similar cracking action between radial ports and annular grooves, so that the sleeve 20a slides a like amount in the downward direction. The system is such, therefore, that any linear movement of the spindle 20b upwardly or downwardly is followed by a like movement of the sleeve 20a. However, the pressure on the sleeve 20a is hydraulically amplified, so that only a slight pressure is required on the central spindle 20b to produce the desired action of the tracer control mechanism.

It has been found that when the structure illustrated in FIG. 2 is operated with very high pressure oil at the inlet 140, there is a tendency for the spindle 20b to bind in the sleeve 20a. This is believed to be due to the fact that high pressure oil from the inlet 140 is routed to the annular chamber or groove 142 and thus is in position to leak through the annulus 200 forming the sliding fit between the central spindle 20b and the sleeve 20a in which it reciprocates. It is believed that this molecular thin lamination of oil, seeking to escape from the high pressure groove 142 to the atmosphere represented by the region 202, is responsive for this binding or high friction phenomenon.

Figure 3:
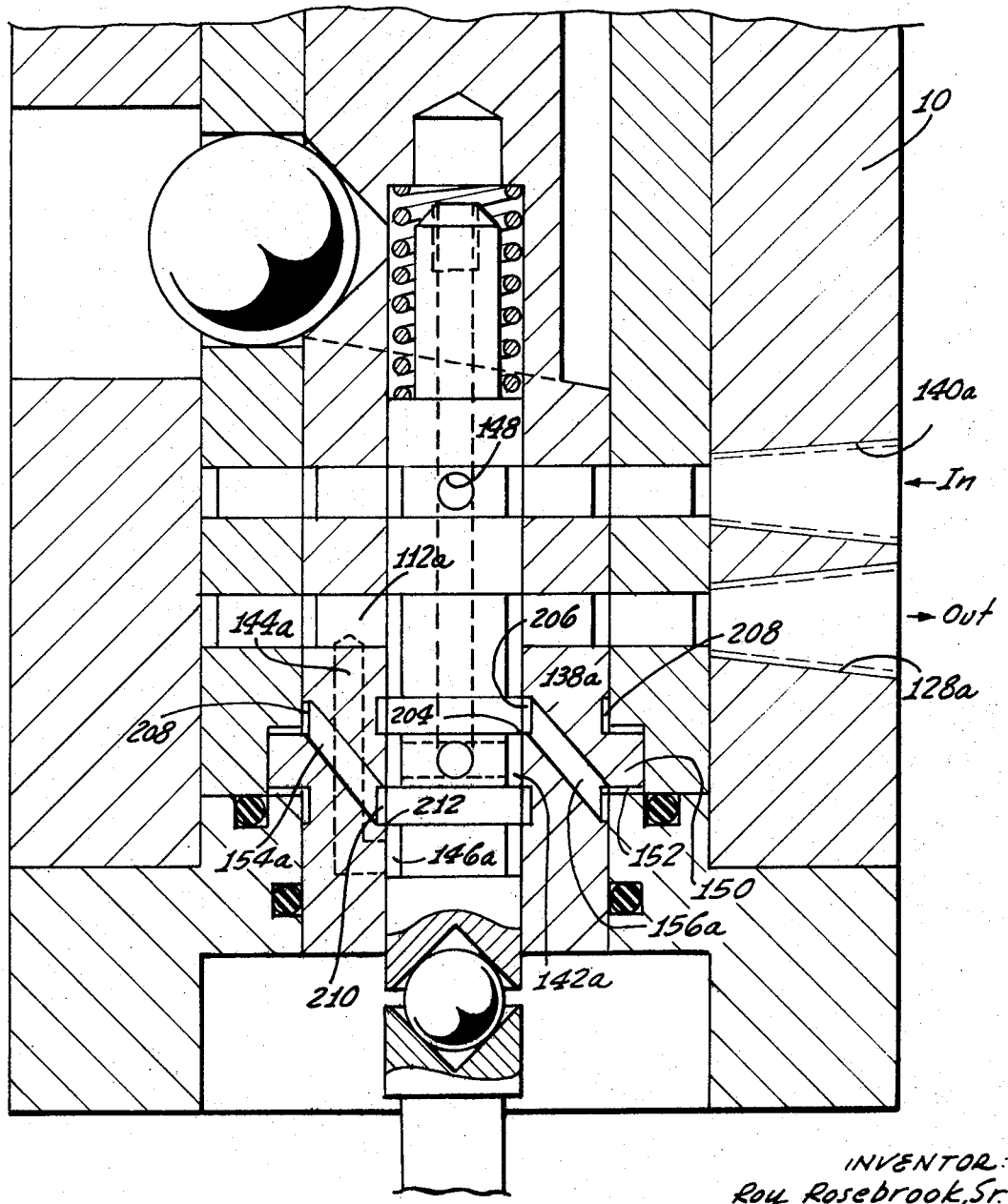
FIG. 3 is a section similar to FIG. 2 illustrating a modified form of structure which obviates a binding problem that is sometimes encountered with the structure of FIG. 2 when the apparatus is used under very high pressure.

To drastically minimize such binding, the structure of FIG. 3 may be employed where very high pressure oil is to be used. In this structure the position of the inlet and exhaust shown at 140 and 128 respectively in FIG. 2 are reversed. The passageway shown at 128a in FIG. 3 becomes the inlet, and the passageway 140a the exhaust. By virtue of the longitudinal axial passage 148, the groove 142a now becomes the high pressure groove, and flow is metered past the shoulder 204 to the groove 206. To transmit the high pressure oil from the groove 206 to the annular cylindrical region 152, the passage 156a extends not only radially outward but also obliquely downward, to connect the groove 206 to the annular region 152. This places actuating pressure beneath the annular piston 150.

From the upper side of the annular piston 150, oil is exhausted via the groove 208, through the oblique inward passage 154a, and thence to the annular groove 210. From this region it is metered across the shoulder 212 into the exhaust or low pressure region 146a. From 146a the exhaust oil flows through the passage 144a to the exhaust port 112a, and thence to the exhaust port 128a formed in the housing 10.

It has been found that by thus reversing the regions of high and low pressure, from FIG. 2 to FIG. 3, the problem of binding is greatly aleviated.

As mentioned above, embodiments of the improved system of the present invention have been shown as incorporating and modifying a tracer control mechanism such as described in the patent identified above. It is evident, of course, that the improved mechanism of the invention may incorporate a wide variety of tracer control mechanisms in which an internal spindle moves linearly within a casing, in response to stylus deflections, or other stylus movements.

What is claimed is:

1. A valve control mechanism comprising:
    a housing;
    a sleeve member located within said housing capable of axial longitudinal movement therein;
    machine tool control means attached to said housing and physically directly connected through first means to said sleeve member for actuation thereby;
    a spindle located within said sleeve member in coaxial relationship therewith and capable of axial longitudinal movement in respect thereto;
    a stylus located within said housing and capable of movement in respect thereto;
    second means coupling said stylus to said spindle to effect lineal movements of said spindle in respect to said sleeve member; and
    a servo boost system intercoupling said spindle and said sleeve member for producing lineal movements of said sleeve member in correspondence with lineal movements of said spindle by said stylus, said boost system being capable of effecting reciprocating movement of said sleeve member, and comprising:
    an annular piston connected to said sleeve member and extending into an annular cylinder formed within said housing,
    said annular cylinder including a first chamber located on one side of said piston and a second chamber located on the opposite side of said piston,
    said spindle and said sleeve member having a plurality of cooperating annular grooves and radial ports for selectively introducing pressurized fluid into said first and second chambers.

2. The mechanism as defined in claim 1 wherein:
    the circumference of said annular piston being larger than the circumference of said sleeve member.

3. The mechanism as defined in claim 1 wherein:
    said first means comprises a ball located within an aperture formed within said sleeve member.

4. The mechanism as defined in claim 1 wherein said cooperating grooves and ports are arranged so:
    upon movement of said spindle in a first axial direction pressurized fluid is conducted into said first chamber to effect movement of said sleeve in the first direction, simultaneously with conducting fluid into said first chamber the fluid contained within said second chamber is removed.

5. The mechanism as defined in claim 1 wherein said cooperating grooves and ports are arranged so:
    upon movement of said spindle in a first axial direction pressurized fluid is conducted into said second chamber to effect movement of said sleeve in the first direction, simultaneously with conducting fluid into said second chamber the fluid contained within said first chamber is removed.

* * * * *